United States Patent
Klaphake et al.

(10) Patent No.: US 9,920,879 B2
(45) Date of Patent: Mar. 20, 2018

(54) LUBRICANT RESERVOIR LOW LEVEL INDICATOR

(71) Applicant: Graco Minnesota Inc., Minneapolis, MN (US)

(72) Inventors: Andrew J. Klaphake, Minneapolis, MN (US); Jeffrey Kidman, Savage, MN (US); Suresha S. Nijaguna, Plymouth, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 241 days.

(21) Appl. No.: 14/909,643

(22) PCT Filed: Aug. 7, 2014

(86) PCT No.: PCT/US2014/050109
§ 371 (c)(1),
(2) Date: Feb. 2, 2016

(87) PCT Pub. No.: WO2015/021258
PCT Pub. Date: Feb. 12, 2015

(65) Prior Publication Data
US 2016/0186929 A1 Jun. 30, 2016

Related U.S. Application Data

(60) Provisional application No. 61/863,334, filed on Aug. 7, 2013.

(51) Int. Cl.
*F16N 19/00* (2006.01)
*F16N 37/00* (2006.01)
(Continued)

(52) U.S. Cl.
CPC ............... *F16N 37/00* (2013.01); *F01M 1/02* (2013.01); *F01M 11/0004* (2013.01);
(Continued)

(58) Field of Classification Search
CPC combination set(s) only.
See application file for complete search history.

(56) References Cited

U.S. PATENT DOCUMENTS 1,171,800 A * 2/1916 Muller ................. B67D 7/3254
137/154
2,282,774 A * 5/1942 Wiggins .............. G01F 23/0023
33/719
(Continued)

FOREIGN PATENT DOCUMENTS

| CN | 1648620 A | 8/2005 |
| CN | 102345483 A | 2/2012 |
| DE | 2641680 A1 | 3/1978 |

OTHER PUBLICATIONS

Extended European Search Report for EP Application No. 14834880.8, dated Jun. 9, 2017, 7 pages.
(Continued)

*Primary Examiner* — Michael A Riegelman
(74) *Attorney, Agent, or Firm* — Kinney & Lange, P.A.

(57) ABSTRACT

A lubrication system comprises a lubricant reservoir, a motorized pump, a follower plate, a stationary rod, a movable sleeve, and a flexible connection. The motorized pump is disposed to pump fluid from the lubricant reservoir to lubricant work lines. The follower plate is situated within the lubricant reservoir. The stationary rod has a colored indicator portion. The movable sleeve disposed concentrically about the stationary rod. The flexible connection extends between the follower plate and the stationary colored rod, such that the flexible connection pulls the movable sleeve away from the stationary rod to reveal the colored indicator portion as the follower plate drops towards a bottom of the lubricant reservoir.

15 Claims, 5 Drawing Sheets

(51) Int. Cl.

| | |
|---|---|
| *F04B 49/06* | (2006.01) |
| *F04B 53/18* | (2006.01) |
| *F04B 17/03* | (2006.01) |
| *F16N 31/02* | (2006.01) |
| *F01M 1/02* | (2006.01) |
| *F01M 11/00* | (2006.01) |
| *F04B 19/22* | (2006.01) |
| *F04C 2/08* | (2006.01) |
| *F04C 14/00* | (2006.01) |
| *F04C 15/00* | (2006.01) |
| *F16N 7/40* | (2006.01) |
| *F16N 21/00* | (2006.01) |
| *F16N 29/00* | (2006.01) |
| *F16N 13/00* | (2006.01) |
| *G01F 23/22* | (2006.01) |
| *G01F 23/40* | (2006.01) |
| *F16N 13/06* | (2006.01) |
| *F16N 29/02* | (2006.01) |

(52) U.S. Cl.
CPC .............. *F04B 17/03* (2013.01); *F04B 19/22* (2013.01); *F04B 49/06* (2013.01); *F04B 49/065* (2013.01); *F04B 53/18* (2013.01); *F04C 2/08* (2013.01); *F04C 14/00* (2013.01); *F04C 15/008* (2013.01); *F16N 7/40* (2013.01); *F16N 13/00* (2013.01); *F16N 13/06* (2013.01); *F16N 19/003* (2013.01); *F16N 21/00* (2013.01); *F16N 29/00* (2013.01); *F16N 29/02* (2013.01); *F16N 31/02* (2013.01); *G01F 23/22* (2013.01); *G01F 23/40* (2013.01); *F01M 2001/023* (2013.01); *F01M 2001/0215* (2013.01); *F01M 2001/0238* (2013.01); *F01M 2001/0253* (2013.01); *F04B 2203/0201* (2013.01); *F16N 19/00* (2013.01); *F16N 2013/063* (2013.01); *F16N 2037/006* (2013.01); *F16N 2250/00* (2013.01)

(56) References Cited

U.S. PATENT DOCUMENTS

| | | | |
|---|---|---|---|
| 3,335,918 A | 8/1967 | Geibel | |
| 4,366,717 A * | 1/1983 | Foord | B01D 35/143 116/268 |
| 4,641,523 A * | 2/1987 | Andreasson | G01F 23/68 338/33 |
| 4,787,253 A * | 11/1988 | deFasselle | G01D 5/06 702/45 |
| 5,196,824 A * | 3/1993 | Helm | F01M 11/12 340/450.3 |
| 6,817,242 B1 | 11/2004 | Moran | |
| 7,313,956 B1 * | 1/2008 | Murphy, Sr. | G01F 23/70 73/305 |
| 8,991,558 B1 * | 3/2015 | Murphy, Sr. | G01F 23/70 184/108 |
| 9,057,654 B2 * | 6/2015 | Gammon | G01L 7/16 |
| 2005/0279317 A1 | 12/2005 | Leasure et al. | |
| 2007/0289994 A1 | 12/2007 | Kotyk | |
| 2009/0078507 A1 | 3/2009 | Gaugush et al. | |
| 2012/0261215 A1 * | 10/2012 | Sharp | B60B 7/0013 184/5.1 |
| 2016/0169448 A1 * | 6/2016 | Holman | F04B 17/03 184/6.4 |

OTHER PUBLICATIONS

International Search Report and Written Opinion from PCT Application Serial No. PCT/US2014/050109, dated Nov. 24, 2014, 12 pages.

Chinese Office Action from Chinese Patent Application No. 201480042934.X, dated Nov. 1, 2017, 14 pages.

* cited by examiner

LUBRICANT RESERVOIR LOW LEVEL INDICATOR

INCORPORATION BY REFERENCE

U.S. provisional application No. 61/863,334 is hereby incorporated by reference in its entirety.

BACKGROUND

The present invention relates generally to lubrication systems. More particularly, the invention relates to a low level indicator for a lubricant reservoir of a mobile lubrication system.

Industrial and construction machinery often requires lubrication to function. Seals, pistons, and bearings of such machinery may require substantial volumes of grease, oil, or other lubricant to protect against wear, prevent corrosion, and/or reduce frictional heating. Mobile machinery is often incorporated into or transported by industrial vehicles, which commonly use portable local lubrication assemblies wherein local lubricant pumps, reservoirs, and injectors are affixed vehicles or devices to ensure adequate lubrication. Local reservoirs have limited capacity sufficient to handle extended ordinary operation, and are refilled with lubricant from a larger source, as needed. Local lubrication assemblies often supply lubricant to multiple lubricant injectors dedicated to different machinery.

SUMMARY

In a first embodiment, a lubrication system comprises a lubricant reservoir, a motorized pump, a follower plate, a stationary rod, a movable sleeve, and a flexible connection. The motorized pump is disposed to pump fluid from the lubricant reservoir to lubricant work lines. The follower plate is situated within the lubricant reservoir. The stationary rod has a colored indicator portion. The movable sleeve disposed concentrically about the stationary rod. The flexible connection extends between the follower plate and the stationary colored rod, such that the flexible connection pulls the movable sleeve away from the stationary rod to reveal the colored indicator portion as the follower plate drops towards a bottom of the lubricant reservoir.

In a second embodiment, an indicator system for a lubricant reservoir comprises a follower plate, a stationary rod, a movable sleeve, and a flexible connection. The follower plate is situated within the lubricant reservoir. The stationary rod has a colored indicator portion. The movable sleeve is disposed concentrically about the stationary rod. The flexible connection extends between the follower plate and the stationary colored rod, such that the flexible connection pulls the movable sleeve away from the stationary rod to reveal the colored indicator portion as the follower plate drops towards a bottom of the lubricant reservoir.

DETAILED DESCRIPTION

The lubrication system of the present invention includes a passive mechanical indicator that provides a continuous visual indicator of remaining lubricant level when a lubricant reservoir is close to empty.

Figure 1:
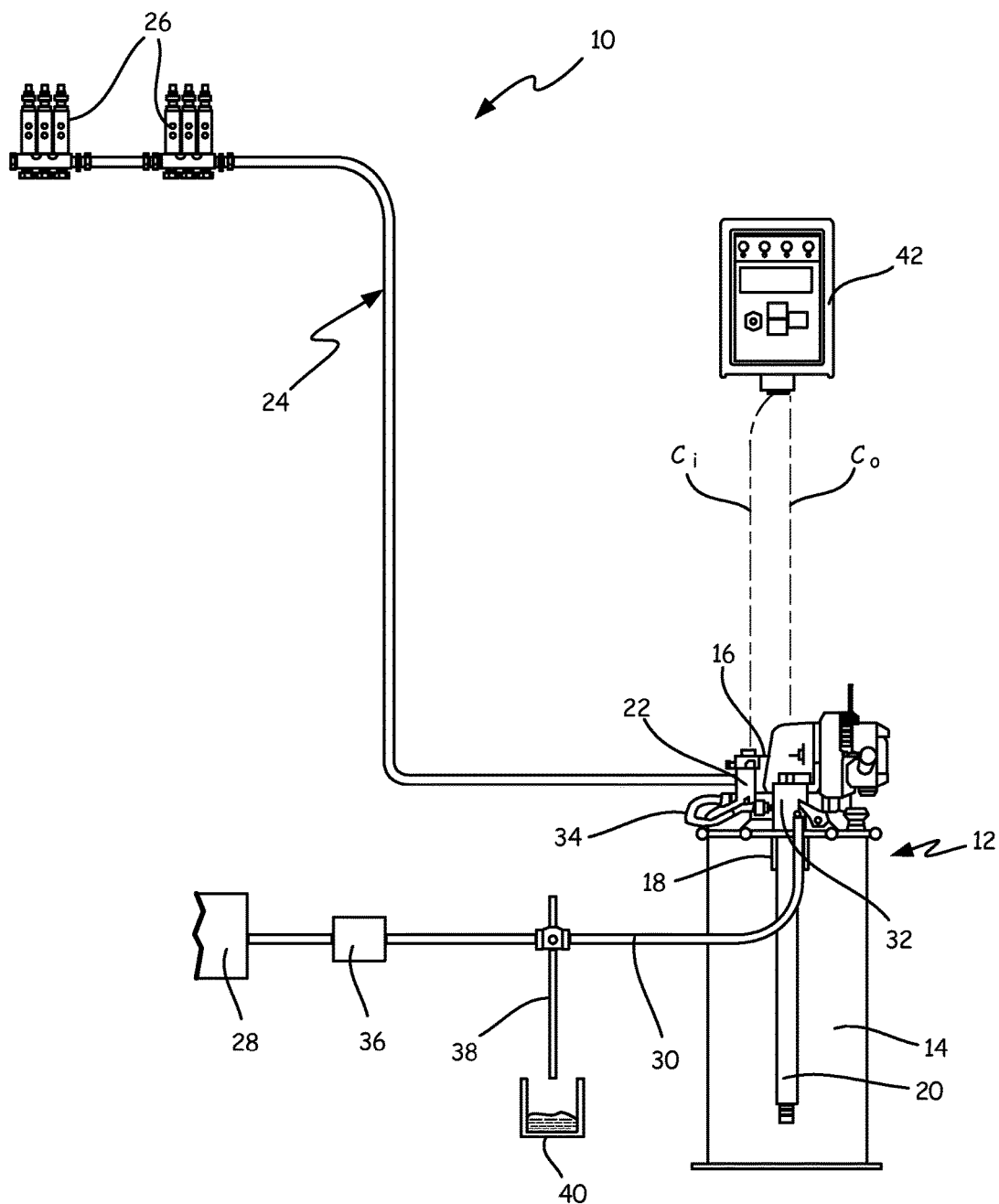
FIG. 1 is a schematic view of a lubrication system.

FIG. 1 is a schematic diagram of lubrication system 10, a system that receives, stores, and supplies lubricant fluid. Lubrication system 10 comprises local assembly 12 with lubricant reservoir 14, motor 16, pump 18, fluid tube 20, input/output manifold 22, lubricant work line 24, and lubricant injectors 26. Lubricant fluid from refill source 28 can be supplied to lubricant reservoir 14 via refill line 30, shutoff valve assembly 32, and reservoir inlet line 34. Refill pump 36 pressurized fluid from refill source 28, and dump line 38 can drain excess lubricant from refill line 30 into lubricant dump 40.

Local assembly 12 is a dedicated lubrication assembly for use with lubricated machinery such as pumps, pistons, seals, bearings, and/or shafts. Local assembly 12 can, for example, be a lubrication assembly mounted on a vehicle or other mobile device for lubrication of mobile components. Lubricant reservoir 14 is a tank or other container for lubricant fluid. In some embodiments, lubricant reservoir 14 can be a substantially cylindrical drum. Motor 16 drives pump 18, which in turn draws lubricant from lubricant reservoir 14 through fluid tube 20, and forces lubricant into lubricant work line 24 through input/output manifold 22, under pressure. Motor 16 can, for example, be an electrical or pneumatic motor. In one embodiment pump 18 is a piston pump. In alternative embodiments, pump 18 can be a reciprocating pump of any other kind, or a gear pump.

Fluid tube 20 is a lubricant-carrying tube that extends from a top location of lubricant reservoir 14 near input/output assembly 22 to bottom location near the base of lubricant reservoir 14. Although fluid tube 20 is depicted as a vertical cylindrical tube, alternative embodiments can bend, be angled, or otherwise have other shapes. Fluid tube 20 can, for example, be a nested tube with concentric inlet and outlet channels. Inlet/outlet manifold 22 provides the entrance and exit for lubricant into or from lubricant reservoir 14. Inlet/output manifold 22 connects to fluid tube 20, lubricant work line 24, and inlet line 34. Lubricant work line 24 is a fluid distribution line that carries lubricant from input/output manifold 22 to lubricant injectors 26, which can be distributed across a plurality of lubricated components (not shown). Although only one lubricant work line 24 is shown, some embodiments of local assembly 12 can comprise multiple lubricant work lines, all connected to input/output manifold 22. Lubricant injectors 26 are injectors or metering devices for grease, oil, or other lubricant materials that are disposed at the locations of lubricated components. Lubricant injectors 26 can, for example, be spring-biased injectors pressurized by motor 18 that fire to supply a metered quantity of lubricant fluid.

Refill source 28 is a source of lubricant material used to refill lubricant reservoir 14, as needed. Refill source 28 can, for example, be a large stationary drum, tank, or container. When lubricant reservoir 14 is depleted, it can be refilled by attaching refill line 30 to shutoff valve assembly 32, which is fluidly connected to input/output manifold 22 via inlet line 34. Refill line 30 can, for example, be a detachable hose associated with refill source 28. Shutoff valve assembly 32 is a valve assembly disposed between refill source 28 and inlet/output manifold 22. Shutoff valve assembly 32 is biased open, but closes when lubricant reservoir 14 is full, preventing overfilling. When shutoff valve assembly 32 is open, fluid from refill source 28 can be pumped through refill line 30, shutoff valve assembly 32, and inlet line 34 into lubricant reservoir 14 by refill pump 36. Refill pump 36 can, for example, be a gear pump, a reciprocating cylinder pump, or any other appropriate pressurizing device. In some embodiments, shutoff valve assembly 32 may not be present, and refill line 30 may feed directly into inlet/output manifold 22. Once lubricant reservoir 14 has been filled, refill line 30 can be disconnected from shutoff valve assembly 32 (or inlet/output manifold 22). Excess lubricant can be exhausted from refill line 30 via dump line 38. Dump line 38 can, for example, be an outlet line or spigot attached to refill line via a manually actuated valve. In some embodiments lubricant dump, can be a waste fluid dump. In other embodiments, lubricant dump 40 can be a recirculation dump that routes excess lubricant back to refill source 28.

Lubrication controller 42 is a logic-capable device such as a dedicated microprocessor or collection of microprocessors, or a non-dedicated computer loaded with appropriate control software. Lubrication controller 42 receives input signals $C_i$ reflecting states of local assembly 12, and controls motor 16 and actuators of local assembly 12 via output signals $C_o$. Lubrication controller 42 can be a part of local assembly 10, or can be a remote controller that communicates with local assembly 12 via a remote data connection such as a wireless connection. Lubrication controller 42 can include user interface components such as a screen, keypad, and/or communication transceiver to provide data to local or remote users, and accept user input commands. In some embodiments lubrication controller 42 can output alarm or alert messages (e.g. via digital signals, lights, and/or sounds) indicating changes in operation of local assembly 12.

Local assembly 12 supplies lubricant to machine components that can be portable or otherwise mobile away from refill source 28. Lubricant reservoir 14 can be refilled as needed, allowing local assembly 12 to operate independently from lubricant source for extended periods, e.g. while associated machine components are in use at a location remote from refill source 28.

Figure 2:
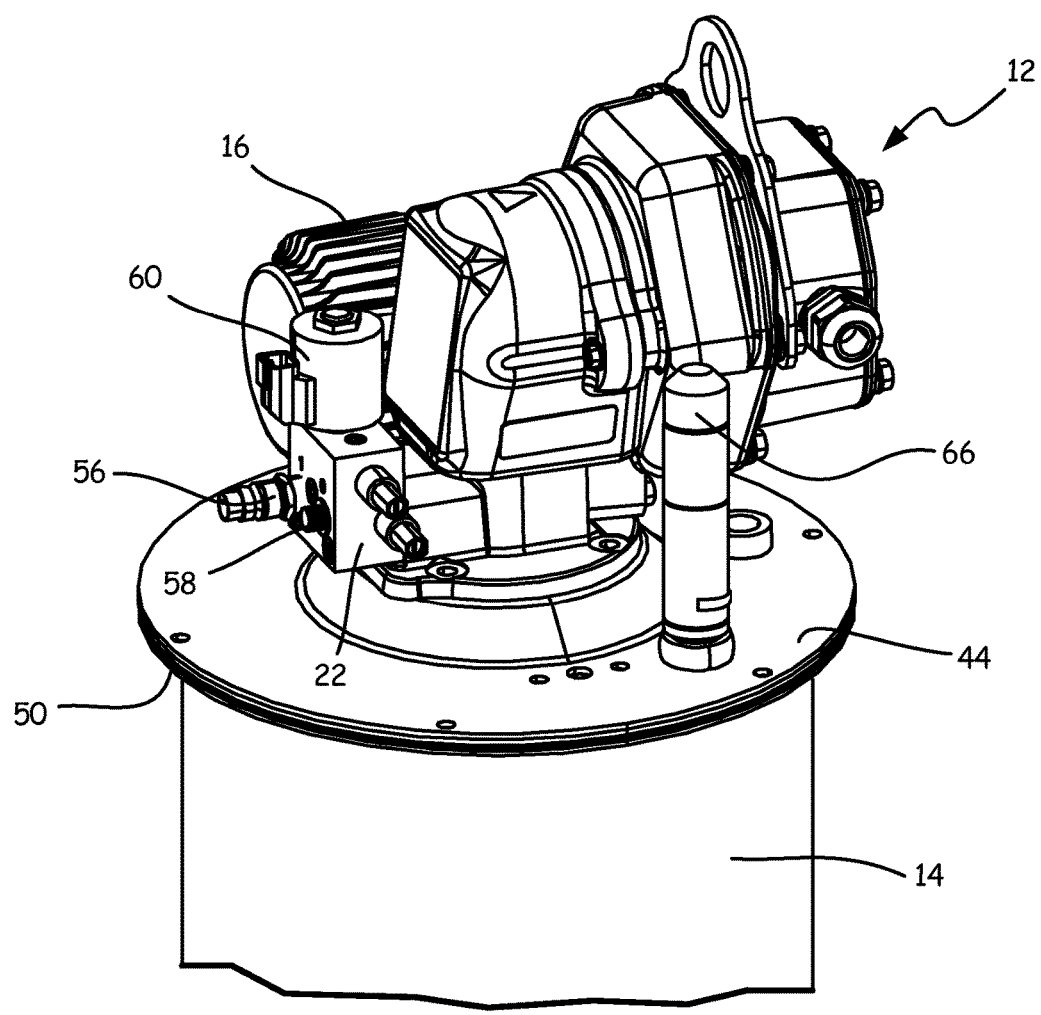
FIG. 2 is a perspective view of a portion of the lubrication system of FIG. 1.

FIG. 2 is a perspective view of a portion of local assembly 12, illustrating lubricant reservoir 14, motor 16, pump 18, fluid tube 20, and inlet/output manifold 22. FIG. 2 further depicts cover plate 44, reservoir lip 50, main inlet 56, main outlet 58, vent valve solenoid 60, and low level indicator 66.

In the depicted embodiment, cover plate 44 is a substantially flat cover to lubricant reservoir 14 that serves as a base for motor 16, pump 18, and low level indicator 66. In an assembled state, cover plate 44 is bolted to reservoir lip 50. Reservoir lip 50 is an annular flange of lubricant reservoir disposed to receive fasteners and form a fluid seal with cover plate 44. As described with respect to FIG. 1, inlet/output manifold 22 is a fluid manifold with fluid passages into/out of fluid tube 20. Main inlet 56 and main outlet 58 are input and output ports of inlet/output manifold 22, respectively. Main outlet 58 connects to lubricant work line 24. In some embodiments, inlet/output manifold 22 can have multiple main outlets servicing multiple lubricant work lines. Main inlet 56 receives refill lubricant from refill source 28 via refill line 30.

In the depicted embodiment, inlet/output manifold 22 is equipped with vent valve solenoid 60, an actuator solenoid that drives a vent valve integral to inlet/output manifold 22. Vent valve solenoid 60 actuates valving in inlet/output manifold 22 according to command signals included among output signals $C_o$ from lubrication controller 42. In this way, inlet/output manifold 22 is able to switch between pumping and vent modes. In pumping modes, pump 18 can drive fluid from lubricant reservoir 14 through main outlet(s) 58 to lubricant work line(s) 24, and/or lubricant reservoir 14 can receive pumped refill lubricant from refill source 28, through main inlet 56. In vent modes, pressurized fluid in lubricant work line 24 is allowed to recycle back through inlet passages of inlet manifold 22 into lubricant reservoir 14 as a pressure relief mechanism.

Low level indicator 66 is a visual indicator seated atop cover plate 44. Low level indicator 66 is a mechanically actuated indicator that provides a continuous indication of lubricant level when lubricant reservoir 14 is nearly empty.

Figure 3:
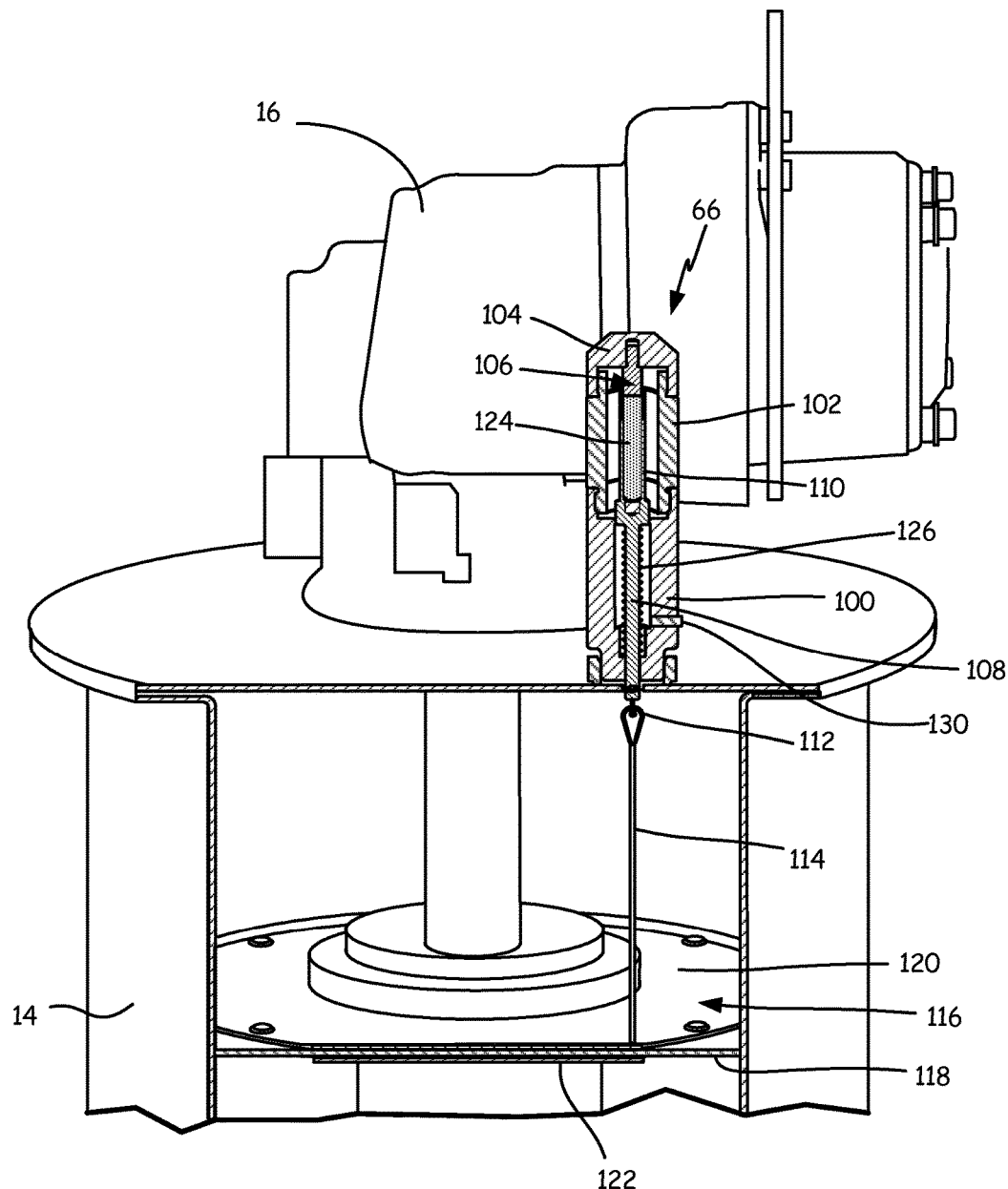
FIG. 3 is a cutaway view of the lubrication system of FIG. 2.

FIG. 3 is a cutaway view of a portion of local assembly 12 of lubrication system 10. FIG. 3 illustrates lubricant reservoir 14, motor 16, and low level indicator 66 as described above with respect to FIG. 2. FIG. 3 further illustrates indicator body 100, transparent window 102, cap 104, indicator rod 106, sleeve rod 108, cover sleeve 110, connector attachment 112, flexible connector 114, follower plate 116 (with follower plate seal 118, follower plate top 120, and follower plate bottom 122), and bias element 126.

Indicator body 100 is a rigid structural body anchored to cover plate 44. Transparent window 102 is a further rigid structural element disposed atop indicator body. In the depicted embodiment, indicator body 100 and transparent window 102 are substantially cylindrical, although alternative embodiments can have different shapes. Transparent window 102 supports cap 104, which anchors indicator rod 106. Transparent window 102 provides a viewing window allowing human operators to see indicator rod 106. Indicator rod 106 includes a colored portion (see FIGS. 4, 5a, 5b, and 5c, described below) that serves as a visual indicator of whether lubricant reservoir 14 is nearly empty. Sleeve rod 108 is a movable rod disposed within indicator body 100, and supporting cover sleeve 110. In some embodiments sleeve rod 108 and cover sleeve rod 110 can be formed as a single component. Cover sleeve 110 is an annular sleeve or sheath that obscures indicator rod 106 when in a top-most position. Follower plate 116 is a sealed plate or disk that follows the top surface of lubricant within lubricant reservoir 14. Flexible connector 114 is a connecting element such as a chain or cord anchored to follower plate 116, and secured to sleeve rod 108 via connector attachment 112.

Follower plate 116 floats atop lubricant within lubricant reservoir 14. So long as lubricant reservoir 14 is substantially full, flexible connector 114 remains slack. As lubricant material is consumed and the lubricant level within lubricant reservoir 14 drops to close to empty, follower plate 116 falls to near the bottom of lubricant reservoir 14, and flexible connector 116 is pulled taught. When lubricant is depleted further, the descent of follower plate 116 pulls sleeve rod 108 downward against a spring force exerted by bias element 126. Bias element 126 may, for example, be a spring coiled about sleeve rod 108. When sleeve rod 108 is pulled downward, cover sleeve 110 retracts to expose indicator rod 106, allowing a portion of indicator rod 106 to be seen through transparent window 102. In this way, the visible portion of indicator rod 106 provides a continuous indication of remaining lubricant in lubricant reservoir 14 when lubricant reservoir 14 is close to empty. More of indicator rod 106 becomes visible through transparent window 102 as lubricant reservoir 14 approaches empty.

Figure 4:
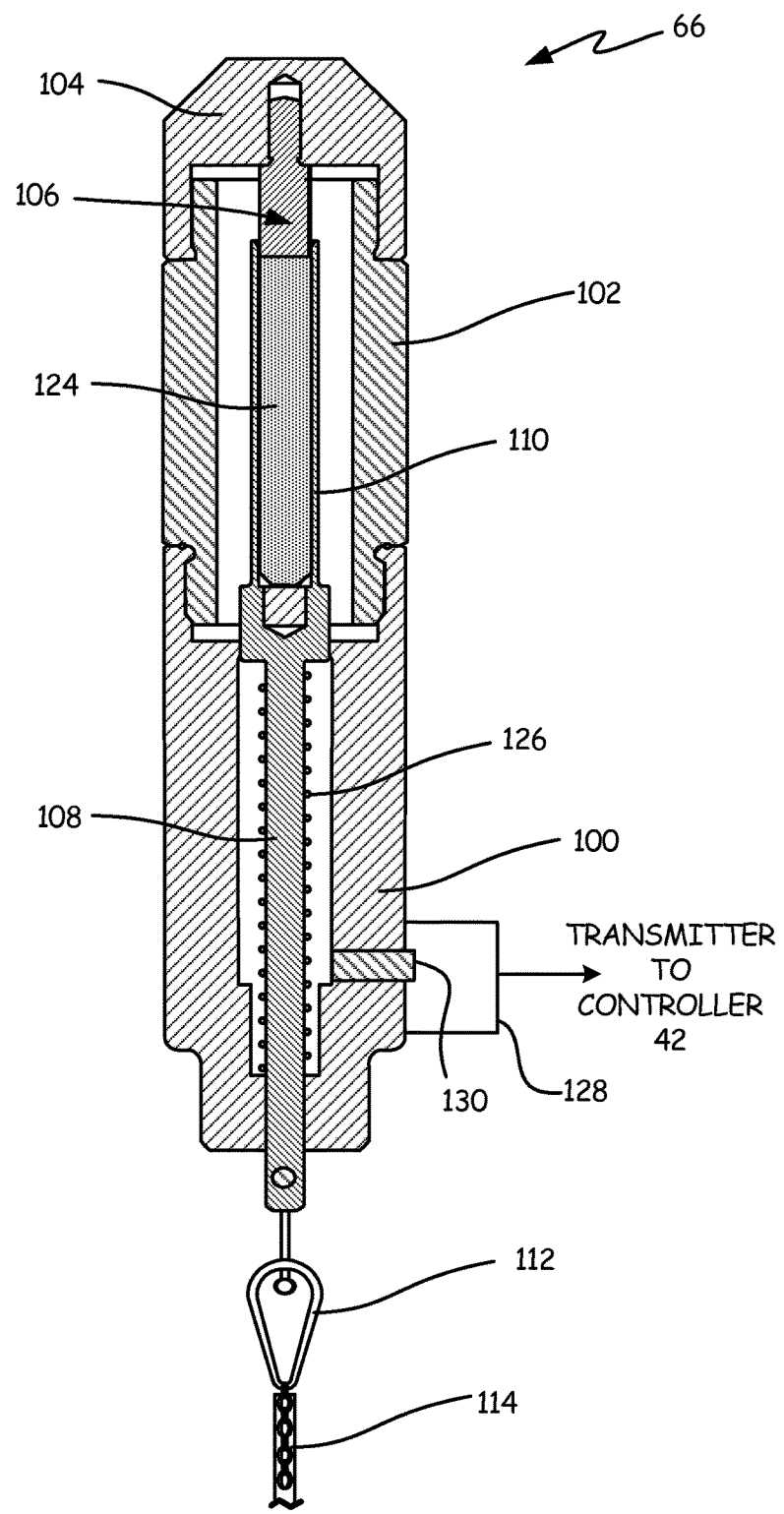
FIG. 4 is a cross-sectional view of an indicator of the lubrication system of FIG. 3.

FIG. 4 is a cross-sectional view of low level indicator 66, illustrating indicator body 100, transparent window 102, cap 104, indicator rod 106, sleeve rod 108, cover sleeve 110, connector attachment 112, flexible connector 114, and bias element 126 as described above with respect to FIG. 3. FIG. 4 further illustrates colored portion 124 of indicator rod 106, transmitter 128, and switch 130.

As described above, flexible connector 114 becomes taught and pulls sleeve rod and cover sleeve 110 away from indicator rod 106 when lubricant reservoir 14 approaches empty. This exposes colored portion 124 of indicator rod 106, making colored portion 124 visible through transparent window 102. Colored portion 124 may constitute the entire length of indicator rod 106, or may be only a portion of indicator rod 106. When colored portion 124 is visible through transparent window 102, lubricant reservoir 14 is nearly empty. The extent of colored portion 124 that is exposed reflects how close lubricant reservoir 14 is to empty. Low level indicator 66 thus provides a passive mechanical indicator of when (and how urgently) lubricant reservoir 14 needs refilling.

Switch 130 is switch actuated by the vertical travel of sleeve rod 108 to a bottom-most position fully exposing indicator rod 106. In one embodiment, switch 130 can be a reed switch actuated when sleeve rod 108 reaches a bottom-most location within indicator body 100 (indicating that lubricant reservoir 14 is empty or nearly empty). In alternative embodiments, switch 130 may be a switch or sensor of any kind actuated by positional changes in sleeve rod 108. Transmitter 128 is a wired or wireless transmitter that transmits a data signal reflecting the stat of switch 130. Transmitter 128 can, for example, be a wired or wireless transmitter that transmits an empty signal to controller 42 when switch 130 is actuated. In alternative embodiments, transmitter 128 can transmit empty signals to other devices, such as handheld peripheral user interfaces or other control devices.

Figure 5A:
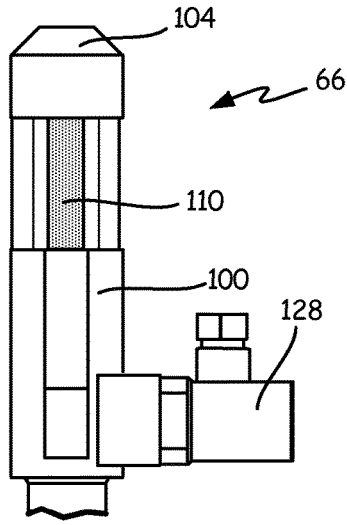
FIGS. 5a, 5b, and 5c are perspective views of the indicator of FIG. 4, in various states.
Figure 5B:
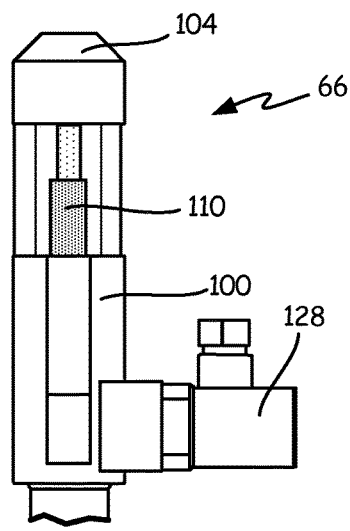
Figure 5C:
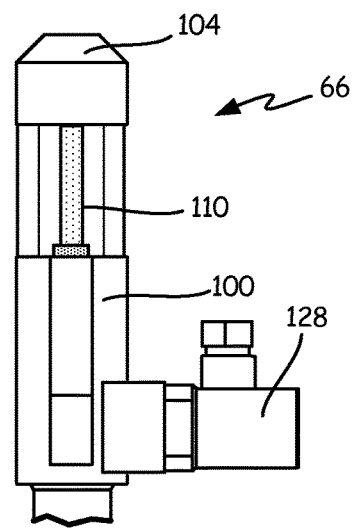

FIGS. 5a, 5b, and 5c are perspective views of low level indicator 66 in three states, illustrating indicator body 100, cap 104, cover sleeve 110, colored portion 124, and transmitter 128. FIG. 5a depicts the state of low level indicator 66 when lubricant reservoir 14 is not close to empty, in which cover sleeve 110 fully obscures colored portion 124. FIG. 4b depicts a state of low level indicator 66 when lubricant reservoir is close to empty but not yet fully depleted, in which cover sleeve 110 is retracted to reveal a section of colored portion 124. FIG. 5c depicts a state of low level indicator 66 when lubricant reservoir is entirely or almost entirely empty, in which cover sleeve 110 is fully retracted from indicator rod 106, fully exposing colored portion 124.

Low level indicator 66 provides both a passive visual indication (via the exposure of colored portion 124) when lubricant reservoir 14 is nearly empty, and an electrical signal reporting reservoir depletion to a controller (via transmitter 128).

Discussion of Possible Embodiments

The following are non-exclusive descriptions of possible embodiments of the present invention.

A lubrication system comprises: a lubricant reservoir; a motorized pump disposed to pump fluid from the lubricant reservoir to lubricant work lines; a follower plate situated within the lubricant reservoir; a stationary rod with a colored indicator portion; a movable sleeve disposed concentrically about the stationary rod; and a flexible connection between the follower plate and the stationary colored rod, such that the flexible connection pulls the movable sleeve away from the stationary rod to reveal the colored indicator portion as the follower plate drops towards a bottom of the lubricant reservoir.

The lubrication system of the preceding paragraph can optionally include, additionally and/or alternatively, any one or more of the following features, configurations and/or additional components:

A further embodiment of the foregoing lubrication system, wherein the stationary rod and the movable sleeve form an indicator assembly mounted atop the lubricant reservoir.

A further embodiment of the foregoing lubrication system, wherein the pump is configured to draw lubricant from the lubricant reservoir via a substantially centrally located fluid tube.

A further embodiment of the foregoing lubrication system, wherein the flexible connection is substantially parallel to the fluid tube.

A further embodiment of the foregoing lubrication system, further comprising a controller disposed to control the motorized pump.

A further embodiment of the foregoing lubrication system, further comprising a transmitter disposed to transmit an empty signal to the controller when the movable sleeve reaches a position revealing at least a portion of the colored indicator portion of the stationary rod.

A further embodiment of the foregoing lubrication system, wherein the transmitter is disposed to transmit the empty signal when triggered by a switch actuated by translation of the movable sleeve.

A further embodiment of the foregoing lubrication system, wherein the flexible connection is slack except when the follower plate drops towards near the bottom of the lubricant reservoir.

An indicator system for a lubricant reservoir, the indicator system comprising: a follower plate situated within the lubricant reservoir; an stationary rod with a colored indicator portion; a movable sleeve disposed concentrically about the stationary rod; and a flexible connection between the follower plate and the stationary colored rod, such that the flexible connection pulls the movable sleeve away from the stationary rod to reveal the colored indicator portion as the follower plate drops towards a bottom of the lubricant reservoir.

The indicator system of the preceding paragraph can optionally include, additionally and/or alternatively, any one or more of the following features, configurations and/or additional components:

A further embodiment of the foregoing indicator system, further comprising: a controller; and a transmitter disposed to transmit an empty signal to the controller when the movable sleeve reaches a position revealing at least a portion of the colored indicator portion of the stationary rod.

A further embodiment of the foregoing indicator system, wherein the transmitter is disposed to transmit the empty signal to the controller when the movable sleeve reaches a position where substantially all of the colored indicator portion is revealed.

A further embodiment of the foregoing indicator system, wherein the transmitter is disposed to transmit the empty signal when triggered by a switch actuated by translation of the movable sleeve.

A further embodiment of the foregoing indicator system, wherein the switch is a reed switch.

A further embodiment of the foregoing indicator system, further comprising a transparent protective window enclosing the stationary rod and the movable sleeve.

A further embodiment of the foregoing indicator system, wherein the movable sleeve is spring biased to obscure the colored indicator portion.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A lubrication system comprises:
   a lubricant reservoir;
   a motorized pump disposed to pump fluid from the lubricant reservoir to lubricant work lines;
   a follower plate situated within the lubricant reservoir;
   a stationary rod with a colored indicator portion;
   a movable sleeve disposed concentrically about the stationary rod; and
   a flexible connection between the follower plate and the stationary colored rod, such that the flexible connection pulls the movable sleeve away from the stationary rod to reveal the colored indicator portion as the follower plate drops towards a bottom of the lubricant reservoir.

2. The lubrication system of claim 1, wherein the stationary rod and the movable sleeve form an indicator assembly mounted atop the lubricant reservoir.

3. The lubrication system of claim 1, wherein the pump is configured to draw lubricant from the lubricant reservoir via a substantially centrally located fluid tube.

4. The lubrication system of claim 3, wherein the flexible connection is substantially parallel to the fluid tube.

5. The lubrication system of claim 1, further comprising a controller disposed to control the motorized pump.

6. The lubrication system of claim 5, further comprising a transmitter disposed to transmit an empty signal to the controller when the movable sleeve reaches a position revealing at least a portion of the colored indicator portion of the stationary rod.

7. The lubrication system of claim 6, wherein the transmitter is disposed to transmit the empty signal when triggered by a switch actuated by translation of the movable sleeve.

8. The lubrication system of claim 1, wherein the flexible connection is slack except when the follower plate drops towards near the bottom of the lubricant reservoir.

9. An indicator system for a lubricant reservoir, the indicator system comprising:
   a follower plate situated within the lubricant reservoir;
   an stationary rod with a colored indicator portion;
   a movable sleeve disposed concentrically about the stationary rod; and
   a flexible connection between the follower plate and the stationary colored rod, such that the flexible connection pulls the movable sleeve away from the stationary rod to reveal the colored indicator portion as the follower plate drops towards a bottom of the lubricant reservoir.

10. The indicator system of claim 9, further comprising:
    a controller; and
    a transmitter disposed to transmit an empty signal to the controller when the movable sleeve reaches a position revealing at least a portion of the colored indicator portion of the stationary rod.

11. The indicator system of claim 10, wherein the transmitter is disposed to transmit the empty signal to the controller when the movable sleeve reaches a position where substantially all of the colored indicator portion is revealed.

12. The indicator system of claim 10, wherein the transmitter is disposed to transmit the empty signal when triggered by a switch actuated by translation of the movable sleeve.

13. The indicator system of claim 12, wherein the switch is a reed switch.

14. The indicator system of claim 9, further comprising a transparent protective window enclosing the stationary rod and the movable sleeve.

15. The indicator system of claim 9, wherein the movable sleeve is spring biased to obscure the colored indicator portion.

* * * * *